(12) United States Patent
Shimizu

(10) Patent No.: US 11,414,149 B2
(45) Date of Patent: Aug. 16, 2022

(54) ELECTRIC MOTOR COOLING STRUCTURE FOR SADDLE-TYPE ELECTRIC VEHICLE

(71) Applicant: HONDA MOTOR CO., LTD., Tokyo (JP)

(72) Inventor: Kenzo Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 810 days.

(21) Appl. No.: 16/328,758

(22) PCT Filed: Aug. 4, 2017

(86) PCT No.: PCT/JP2017/028435
§ 371 (c)(1),
(2) Date: Feb. 27, 2019

(87) PCT Pub. No.: WO2018/061482
PCT Pub. Date: Apr. 5, 2018

(65) Prior Publication Data
US 2019/0263291 A1    Aug. 29, 2019

(30) Foreign Application Priority Data
Sep. 29, 2016 (JP) .............................. JP2016-191467

(51) Int. Cl.
*B62M 7/12* (2006.01)
*B62J 50/30* (2020.01)
(Continued)

(52) U.S. Cl.
CPC ................ *B62J 43/16* (2020.02); *B60K 1/04* (2013.01); *B60L 58/26* (2019.02); *B62J 50/30* (2020.02);
(Continued)

(58) Field of Classification Search
CPC ........................................................ B62J 50/30
(Continued)

(56) References Cited

U.S. PATENT DOCUMENTS

| 4,754,833 A * | 7/1988 | Kawashima | ......... B62K 25/283 |
| | | | 474/93 |
| 7,210,550 B2 * | 5/2007 | Yonehana | ................. B60L 7/12 |
| | | | 180/220 |

(Continued)

FOREIGN PATENT DOCUMENTS

| CN | 1104598 | 7/1995 |
| CN | 1259915 | 7/2000 |

(Continued)

OTHER PUBLICATIONS

Japanese Notice of Allowance for Japanese Patent Application No. 2018-541967 dated Aug. 27, 2019.

(Continued)

*Primary Examiner* — Kevin Hurley
*Assistant Examiner* — Hosam Shabara
(74) *Attorney, Agent, or Firm* — Amin, Turocy & Watson, LLP

(57) ABSTRACT

In an electric motor cooling structure (20) of a motorcycle, a swing arm (21) includes an electric motor accommodating section (60) configured to accommodate an electric motor (11), and a cooling air intake port (61) opening toward the outside of the electric motor accommodating section (60) and disposed on one side of the electric motor (11), a cooling air outlet port (62) opening toward the outside of the electric motor accommodating section (60) and disposed on the other side of the electric motor (11), and a communication section (63) in communication with the cooling air intake port (61) and the cooling air outlet port (62) and configured to distribute cooling air introduced from the cooling air (Continued)

intake port (61) to both sides of the electric motor (11) are provided in the electric motor accommodating section (60).

9 Claims, 9 Drawing Sheets

(51) Int. Cl.
| | |
|---|---|
| B62K 11/10 | (2006.01) |
| B62K 25/28 | (2006.01) |
| B62J 43/16 | (2020.01) |
| B60L 58/26 | (2019.01) |
| B60K 1/04 | (2019.01) |
| B62K 11/02 | (2006.01) |
| B62M 7/02 | (2006.01) |

(52) U.S. Cl.
CPC .............. B62K 11/02 (2013.01); B62K 11/10 (2013.01); B62K 25/283 (2013.01); B62M 7/02 (2013.01); B62M 7/12 (2013.01); B62K 2204/00 (2013.01)

(58) Field of Classification Search
USPC .......................................................... 180/220
See application file for complete search history.

(56) References Cited

U.S. PATENT DOCUMENTS

| | | | | |
|---|---|---|---|---|
| 7,497,288 | B2* | 3/2009 | Tsukada | H02K 7/006 180/68.1 |
| 7,931,110 | B2* | 4/2011 | Nishiura | B62M 7/12 180/68.5 |
| 8,936,129 | B2* | 1/2015 | Honda | B62K 11/10 180/291 |
| 8,955,627 | B2* | 2/2015 | Hatanaka | B62K 11/10 180/68.5 |
| 9,296,444 | B2* | 3/2016 | Matsuda | B62J 43/28 |
| 9,643,514 | B2* | 5/2017 | Matsuda | B60L 50/51 |
| 2010/0078251 | A1 | 4/2010 | Nishiura et al. | |
| 2012/0000720 | A1 | 1/2012 | Honda et al. | |
| 2012/0181097 | A1 | 7/2012 | Hatanaka et al. | |
| 2015/0008053 | A1 | 1/2015 | Matsuda | |

FOREIGN PATENT DOCUMENTS

| | | |
|---|---|---|
| CN | 103889833 | 6/2014 |
| FR | 2703636 | 12/1995 |
| JP | 05-042892 | 2/1993 |
| JP | 2010-083372 | 4/2010 |
| JP | 2010-083373 | 4/2010 |
| JP | 2010-233372 | 10/2010 |
| JP | 2010-247811 | 11/2010 |
| JP | 2012-144178 | 8/2012 |
| JP | 2013-241153 | 12/2013 |
| WO | WO-2020066339 A1 * | 4/2020 |
| WO | WO-2021181251 A1 * | 9/2021 |

OTHER PUBLICATIONS

International Search Report and Written Opinion for International Application No. PCT/JP2017/028435 dated Oct. 10, 2017, 9 pgs.
Indian Office Action for Indian Patent Application No. 201917007847 dated Jul. 10, 2020.
Chinese Office Action for Chinese Patent Application No. 201780059820.X dated Mar. 16, 2020.

* cited by examiner

ELECTRIC MOTOR COOLING STRUCTURE FOR SADDLE-TYPE ELECTRIC VEHICLE

TECHNICAL FIELD

The present invention relates to an electric motor cooling structure for a saddle riding electric vehicle.

Priority is claimed on Japanese Patent Application No. 2016-191467, filed Sep. 29, 2016, the content of which is incorporated herein by reference.

BACKGROUND ART

In the related art, for example, Patent Literature 1 discloses an electric motor cooling structure for a saddle riding electric vehicle. The structure divides an internal space of a swing arm into an air introduction space and an equipment attachment space via a partition wall. A front opening section is formed in a front end portion of the swing arm. An air discharge port is formed in a rear lower section of the swing arm. An air hole that communicates with the air introduction space and the equipment attachment space is formed in a portion of the partition wall to which a power generating motor is attached. An air guide wall having a discharge passage configured to discharge air introduced from the air hole to the outside from the air discharge port via the power generating motor is formed on the swing arm.

CITATION LIST

Patent Literature

[Patent Literature 1]
Japanese Unexamined Patent Application, First Publication No. 2010-83373

SUMMARY OF INVENTION

Technical Problem

However, since an air hole is formed in a partition wall provided on one side surface side of a power generating motor, air introduced from the air hole abuts one side surface of the power generating motor and is then discharged from an air discharge port. For this reason, it is difficult to cool the entire power generating motor, and there is a room for improvement in improving a cooling efficiency of the power generating motor.

An aspect of the present invention is directed to improving a cooling efficiency of an electric motor in an electric motor cooling structure for a saddle riding electric vehicle including the electric motor attached to a swing arm.

Solution to Problem

An electric motor cooling structure for a saddle riding electric vehicle according to the present invention employs the following configurations.

(1) An electric motor cooling structure for a saddle riding electric vehicle according to an aspect of the present invention includes a swing arm pivotably supported by a vehicle body frame of a saddle riding electric vehicle at a pivot section and extending rearward from the pivot section to rotatably support a rear wheel; and an electric motor attached to the swing arm and configured to drive the rear wheel, wherein the swing arm includes an electric motor accommodating section configured to accommodate the electric motor, and the electric motor accommodating section (60) includes: a cooling air intake port opening toward an outside of the electric motor accommodating section and disposed on one side of the electric motor, a cooling air outlet port opening toward an outside of the electric motor accommodating section and disposed on the other side of the electric motor, and a communication section in communication with the cooling air intake port and the cooling air outlet port and configured to distribute cooling air introduced from the cooling air intake port to both sides of the electric motor.

(2) In the aspect of (1), the cooling air intake port and the cooling air outlet port may be disposed to sandwich the electric motor (11) therebetween to be deviated in an upward/downward direction.

(3) In the aspect of (1) or (2), a protrusion protruding toward an inside of the electric motor accommodating section and directed toward the cooling air outlet port may be provided on an inner wall of the electric motor accommodating section.

(4) In the aspect of any one of (1) to (3), the cooling air intake port may be provided above the electric motor accommodating section and the cooling air outlet port may be provided below the electric motor accommodating section.

(5) In the aspect of (4), an upper cover member opening downward and configured to cover the cooling air intake port from above may be further provided.

(6) In the aspect of (4) or (5), a fan configured to introduce external air from the cooling air intake port and send the cooling air to the electric motor may be further provided.

(7) In the aspect of (6), the fan may be disposed below the cooling air outlet port, and may further include an outer circumference cover member configured to cover at least a part of an outer circumference of the fan.

(8) In the aspect of (7), the outer circumference cover member may be displaceable between a covering position at which the outer circumference of the fan is covered and an exposing position at which the outer circumference of the fan is exposed.

(9) In the aspect of any one of (6) to (8), a lower cover member configured to cover the fan from below may be further provided.

(10) In the aspect of (9), a cooling air blocking section configured to block the cooling air sent from the fan may be provided in front of the lower cover member, and a cooling air discharge port configured to discharge the cooling air sent from the fan rearward may be provided behind the lower cover member.

(11) In the aspect of any one of (1) to (10), a rotation axis of the electric motor may extend in a vehicle forward/rearward direction, and an external form of the electric motor may have a circular shape when seen in a direction along the rotation axis.

Advantageous Effects of Invention

According to the aspect of (1), since the communication section in communication with the cooling air intake port and the cooling air outlet port and configured to distribute the cooling air introduced from the cooling air intake port to both sides of the electric motor is provided in the electric motor accommodating section, the cooling air can abut both side surfaces of the electric motor. For this reason, in comparison with the case in which the cooling air abuts one side surface only of the electric motor, the entire electric motor is easily cooled. Accordingly, a cooling efficiency of the electric motor can be improved.

According to the aspect of (2), since the cooling air intake port and the cooling air outlet port are disposed to sandwich the electric motor therebetween to be eccentric in the upward/downward direction, the cooling air introduced from the cooling air intake port can be distributed throughout the electric motor accommodating section. For this reason, in comparison with the case in which the cooling air intake port and the cooling air outlet port are disposed to be concentric in the upward/downward direction, the entire electric motor is easily cooled.

Accordingly, a cooling efficiency of the electric motor can be further improved.

According to the aspect of (3), since the protrusion protruding toward the inside of the electric motor accommodating section and directed to the cooling air outlet port is provided on the inner wall of the electric motor accommodating section, the cooling air introduced from the cooling air intake port can be guided to the cooling air outlet port along the protrusion. For this reason, in comparison with the case in which the inner wall of the electric motor accommodating section is simply flat, the cooling air can be rectified. Accordingly, a cooling efficiency of the electric motor can be further improved.

According to the aspect of (4), since the cooling air intake port is provided above the electric motor accommodating section and the cooling air outlet port is provided below the electric motor accommodating section, the cooling air introduced from above the electric motor accommodating section can be guided downward. That is, even when the cooling air that has cooled the electric motor becomes hot air, the hot air can be guided downward. For this reason, the hot air being guided toward a driver can be avoided.

According to the aspect of (5), since the upper cover member that opens downward and configured to cover the cooling air intake port from above is further provided, intrusion of foreign matter such as rain water or the like into the electric motor accommodating section can be curtailed.

According to the aspect of (6), since the fan configured to introduce external air from the cooling air intake port and send the cooling air to the electric motor is further provided, the electric motor can be cooled through forced air cooling by the fan. For this reason, in comparison with the case in which the electric motor is cooled through only natural air cooling due to moving air, a cooling efficiency of the electric motor can be improved.

According to the aspect of (7), since the fan is disposed below the cooling air outlet port and further includes the outer circumference cover member configured to cover at least a part of the outer circumference of the fan, in comparison with the case in which the outer circumference of the fan is exposed, the cooling air introduced from above the electric motor accommodating section is easily guided downward by the fan. For this reason, even when the cooling air that has cooled the electric motor becomes hot air, the hot air is easily avoided from being guided toward a driver.

According to the aspect of (8), since the outer circumference cover member is displaceable between the covering position at which the outer circumference of the fan is covered and the exposing position at which the outer circumference of the fan is exposed, a direction of the cooling air introduced from above the electric motor accommodating section can be adjusted by the fan. At the covering position, the cooling air introduced from above the electric motor accommodating section is easily guided downward by the fan. For this reason, even when the cooling air that has cooled the electric motor becomes hot air, the hot air is easily avoided from being guided toward a driver. Meanwhile, at the exposing position, the cooling air introduced from above the electric motor accommodating section is easily guided toward the outside of the fan in the radial direction by the fan. For this reason, scattering of dust, dead leaves, and so on, on a road surface during stoppage of the vehicle can be minimized.

According to the aspect of (9), since the lower cover member configured to cover the fan from below is further provided, a downward flow of the cooling air introduced from above the electric motor accommodating section by the fan can be deflected by the lower cover member. For this reason, scattering of dust, dead leaves, and so on, on a road surface during stoppage of the vehicle can be more reliably minimized.

According to the aspect of (10), since the cooling air blocking section configured to block the cooling air sent from the fan is provided in front of the lower cover member and the cooling air discharge port configured to discharge the cooling air sent from the fan rearward is provided behind the lower cover member, a forward flow of the cooling air introduced from above the electric motor accommodating section by the fan can be blocked by the cooling air blocking section and the cooling air introduced from above the electric motor accommodating section can be discharged rearward from the cooling air discharge port by the fan. For this reason, even when the cooling air that has cooled the electric motor becomes hot air, the hot air can be avoided from being guided toward a driver, and scattering of dust, dead leaves, and so on, on a road surface during stoppage of the vehicle can be minimized.

According to the aspect of (11), since the rotation axis of the electric motor extends in the vehicle forward/rearward direction and the external form of the electric motor has a circular shape when seen in a direction along the rotation axis, the cooling air introduced from the cooling air intake port can be rectified along the curved outer circumferential surface of the electric motor. For this reason, in comparison with the case in which the external form of the electric motor has a rectangular parallelepiped shape, the entire electric motor is easily cooled. Accordingly, a cooling efficiency of the electric motor can be improved.

DESCRIPTION OF EMBODIMENTS

Figure 1:
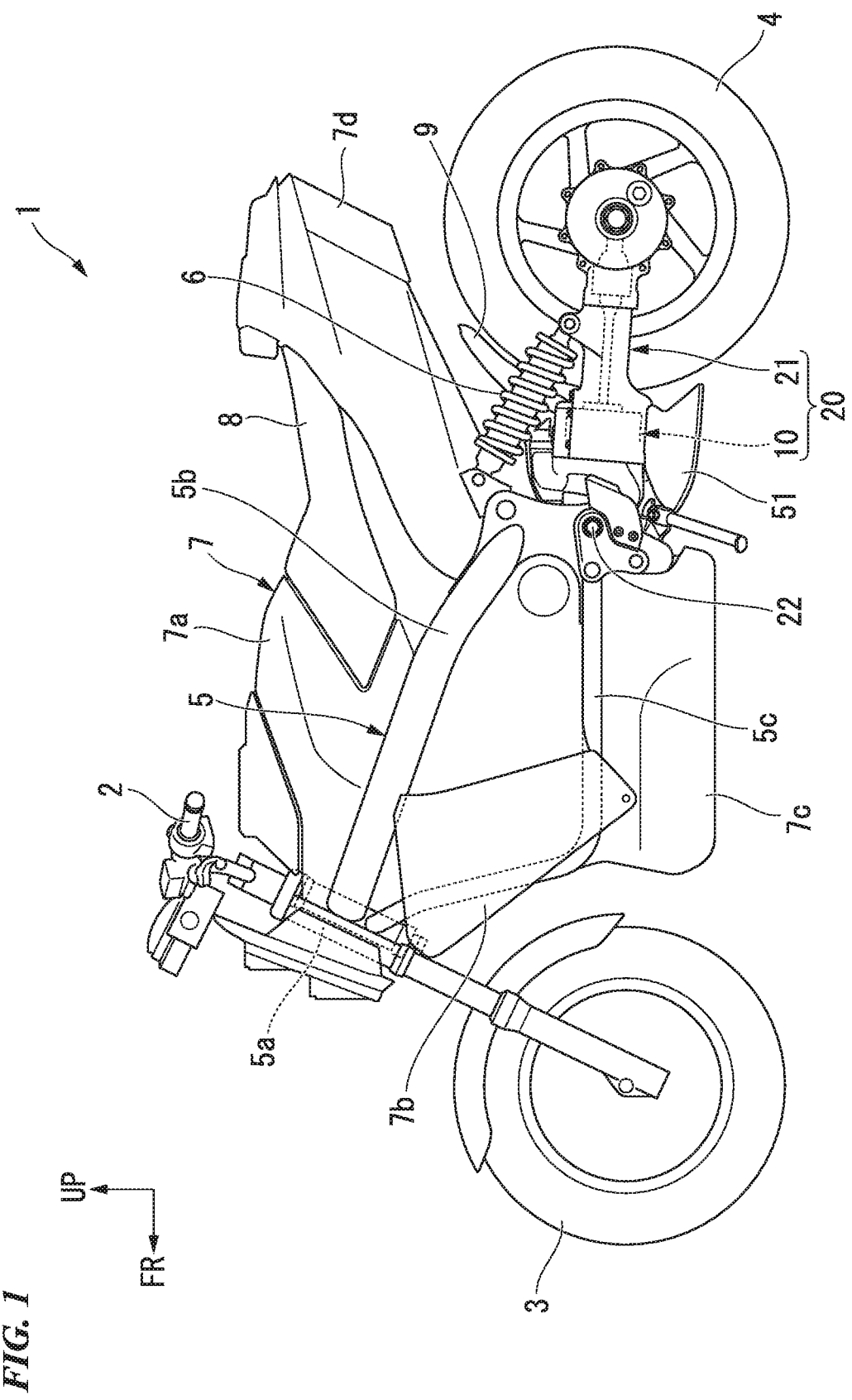
FIG. 1 is a left side view of a motorcycle according to an embodiment.

Hereinafter, an embodiment of the present invention will be described with reference to the accompanying drawings. Further, directions of forward, rearward, leftward, rightward, and so on, in the following description are the same as directions in a vehicle described below unless the context clearly indicates otherwise. In addition, in appropriate places in the drawings used in the following description, an arrow FR indicates a forward direction with respect to a vehicle, an arrow LH indicates a leftward direction with respect to the vehicle, and an arrow UP indicates an upward direction with respect to the vehicle.

<Entire Vehicle>

FIG. 1 shows a motorcycle 1 as an example of a saddle riding electric vehicle. Referring to FIG. 1, the motorcycle 1 includes a front wheel 3 steered by a handle 2, and a rear wheel 4 driven by a driving unit 10 including an electric motor 11 (see FIG. 5). Hereinafter, the motorcycle 1 may be simply referred to as "a vehicle."

Steering system parts including the handle 2 and the front wheel 3 are steerably supported by a head pipe 5a formed on a front end portion of a vehicle body frame 5. A handle steering shaft (not shown) connected to the handle 2 is inserted through the head pipe 5a. A swing arm 21 attached to the driving unit 10 is supported by a rear section of the vehicle body frame 5 to be vertically swingable about a pivot shaft 22. A rear suspension 6 is interposed between a front section of the swing arm 21 and a rear section of the vehicle body frame 5.

For example, the vehicle body frame 5 is formed by integrally coupling steel members of a plurality of kinds through welding or the like. The vehicle body frame 5 includes a pair of left and right main frames 5b extending to be bent downward after extending rearward and downward from a vertical central section of the head pipe 5a, a pair of left and right lower frames 5c extending to be bent rearward after extending downward to be slightly inclined to be disposed at a rearward position going downward from a lower section of the head pipe 5a and connected to rear lower sections of the left and right main frames 5b, and a cross member (not shown) extending in a vehicle width direction to connect the left and right main frames 5b and the left and right lower frames 5c.

The vehicle body frame 5 is covered with a vehicle body cover 7. The vehicle body cover 7 includes an upper cowl 7a configured to cover an upper section of the vehicle body frame 5, a front side cowl 7b configured to cover a side of a front section of the vehicle body frame 5, an under cowl 7c configured to cover a lower section of the vehicle body frame 5, and a rear cowl 7d configured to cover a rear section of the vehicle body frame 5. Further, reference numeral 8 in the drawings designates a seat on which an occupant sits, and reference numeral 9 in the drawings designates a rear fender (an upper cover member) configured to cover a front upper section of the rear wheel 4.

In the embodiment, a power generation system configured to allow exchange between chemical energy and electrical energy using a chemical reaction between hydrogen and oxygen is employed. While not shown, a fuel cell stack, a hydrogen tank, a hydrogen supply system, a battery, an inverter, a power drive unit (PDU) configured to control a flow of electricity, a voltage control unit (VCU) configured to elevate a voltage, and so on, are attached to the vehicle body frame 5.

The hydrogen supply system supplies hydrogen accumulated in the hydrogen tank to the fuel cell stack. The fuel cell stack generates electricity using the supplied hydrogen and oxygen in external air. The electricity is supplied to the inverter and electrical equipment (not shown) while being provided for charging of the battery. The inverter electrically generates alternating current power from direct current power supplied from at least one of the fuel cell stack and the battery. The electric motor 11 is driven to be rotated by alternating current power generated in the inverter, and drives the rear wheel 4.

<Electric Motor Cooling Structure>

Figure 2:
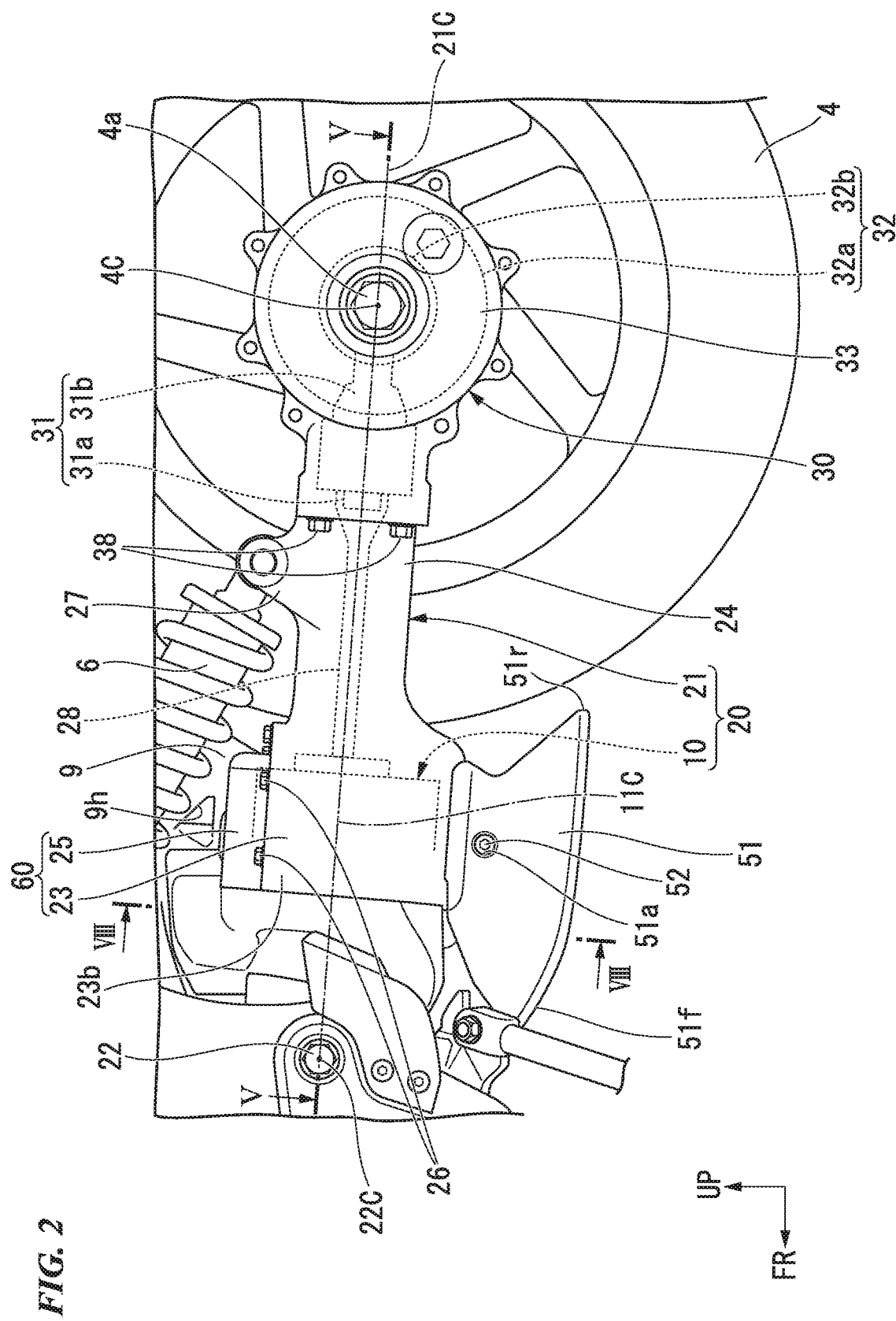
FIG. 2 is a left side view of an electric motor cooling structure according to the embodiment.

As shown in FIG. 2, an electric motor cooling structure 20 includes the swing arm 21 extending rearward from the pivot section 22a and configured to support the rear wheel 4 to be rotatable while pivotably supporting the vehicle body frame 5 (see FIG. 1) using a pivot section 22a (see FIG. 3), and the electric motor 11 (see FIG. 5) attached to the swing arm 21 and configured to drive the rear wheel 4.

Further, reference numeral 12 in the drawings designates a speed reducer (see FIG. 5) configured to reduce an output of the electric motor 11 and transmit the reduced output to the rear wheel 4, reference numeral 30 in the drawings designates a rear wheel support mechanism configured to rotatably support an axle 4a (hereinafter, referred to as "a rear wheel axle 4a") of the rear wheel 4, reference numeral 40 in the drawings designates a housing (see FIG. 3) separately provided from the swing arm 21 and attached to the swing arm 21, and reference numeral 28 in the drawings designates a drive shaft configured to transmit power from the speed reducer 12 to the rear wheel 4.

Figure 3:
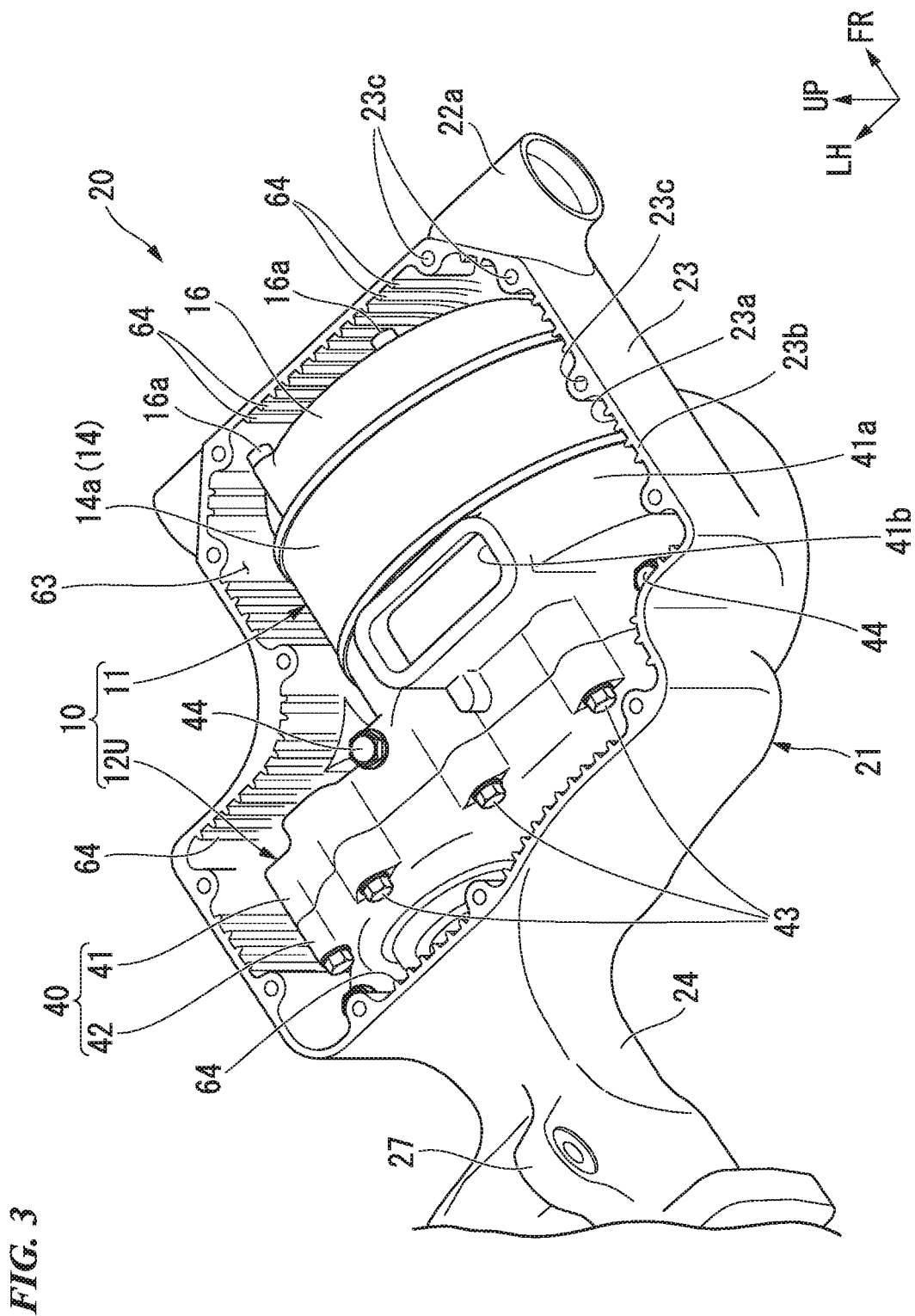
FIG. 3 is a perspective view showing the electric motor cooling structure according to the embodiment from a right upper rear side.

As shown in FIG. 3, the speed reducer 12 (see FIG. 5) and the housing 40 constitute a speed reducer unit 12U configured to integrally attach the speed reducer 12 to the housing 40. Further, the electric motor 11 and the speed reducer unit 12U constitute the driving unit 10 configured to integrally attach the electric motor 11 to the housing 40 together with the speed reducer 12.

<Swing Arm>

As shown in FIG. 2, the swing arm 21 includes a unit accommodating section 60 (an electric motor accommodating section) disposed in front of the rear wheel 4 and configured to accommodate the driving unit 10, and an arm section 24 disposed on a left side of the rear wheel 4 and through which the drive shaft 28 is inserted.

<Unit Accommodating Section (Electric Motor Accommodating Section)>

Figure 5:
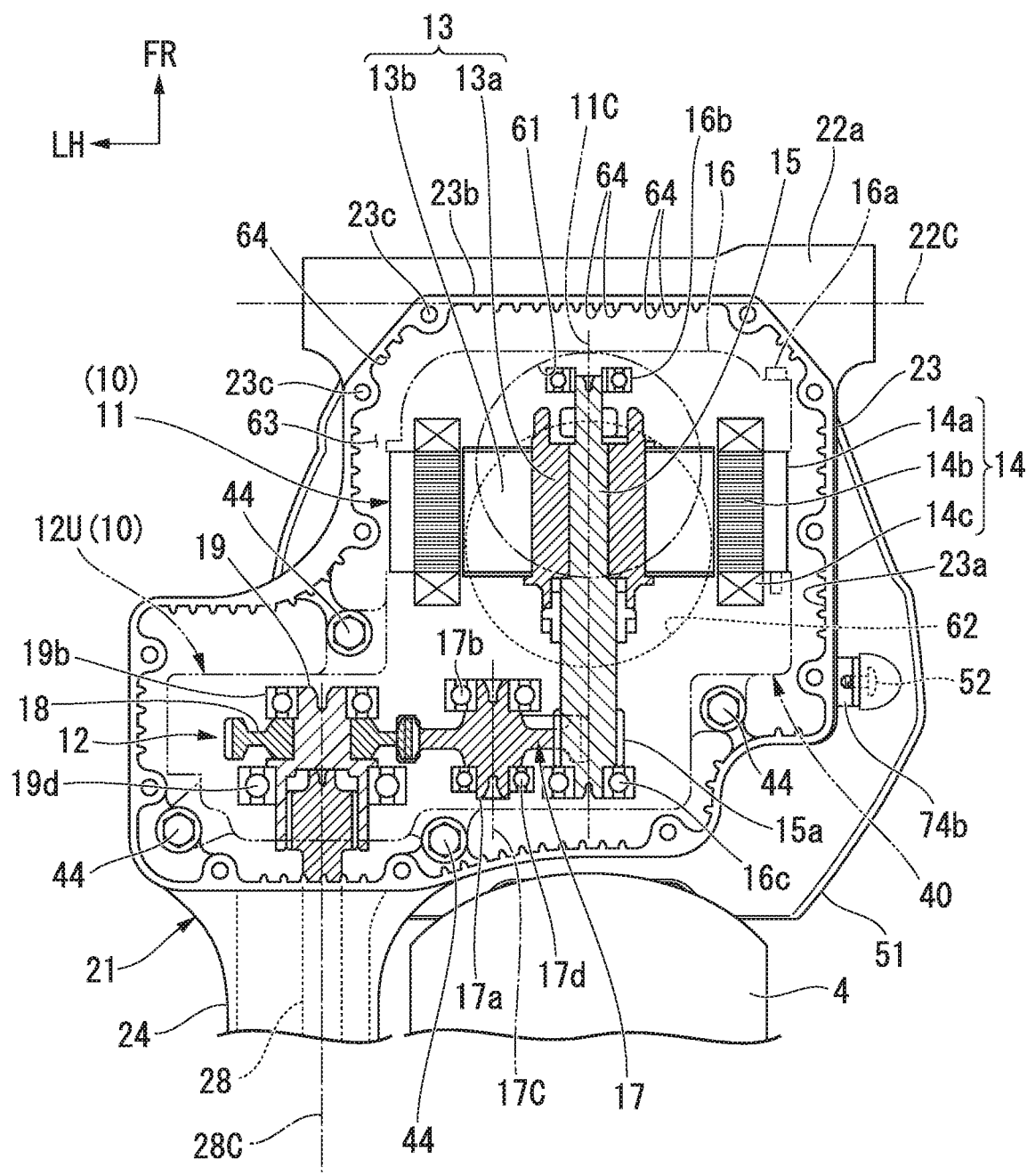
FIG. 5 is a view including a cross section taken along line V-V in FIG. 2.

As shown in FIG. 3, the unit accommodating section 60 (see FIG. 2) includes an accommodating section main body 23 having an opening 23a configured to accommodate the driving unit 10, and a lid 25 (see FIG. 2) configured to open and close the opening 23a of the accommodating section main body 23. As shown in FIG. 5, a cooling air intake port 61 opening toward the outside of the unit accommodating section 60 and disposed on one side of the electric motor 11, a cooling air outlet port 62 opening toward the outside of the unit accommodating section 60 and disposed on the other side of the electric motor 11, and a communication section 63 configured to allow the cooling air intake port 61 and the cooling air outlet port 62 to communicate with each other are provided in the unit accommodating section 60. Further, the accommodating section main body 23 and the arm section 24 are integrally formed of the same member.

The opening 23a of the accommodating section main body 23 opens upward. The pivot section 22a having a cylindrical shape extending in the vehicle width direction is provided on a front end portion of the accommodating section main body 23. When seen in a cross-sectional view of FIG. 5, the accommodating section main body 23 is formed in an L-shaped box form that is bent leftward after extending rearward from the pivot section 22a. When seen in the cross-sectional view of FIG. 5, a portion of a rear wall of the accommodating section main body 23 facing a tire of the rear wheel 4 is formed in an arc shape along a contour of the tire. Further, reference numeral 22C in the drawings designates a pivot axis that is a central axis of the pivot section 22a.

Figure 4:
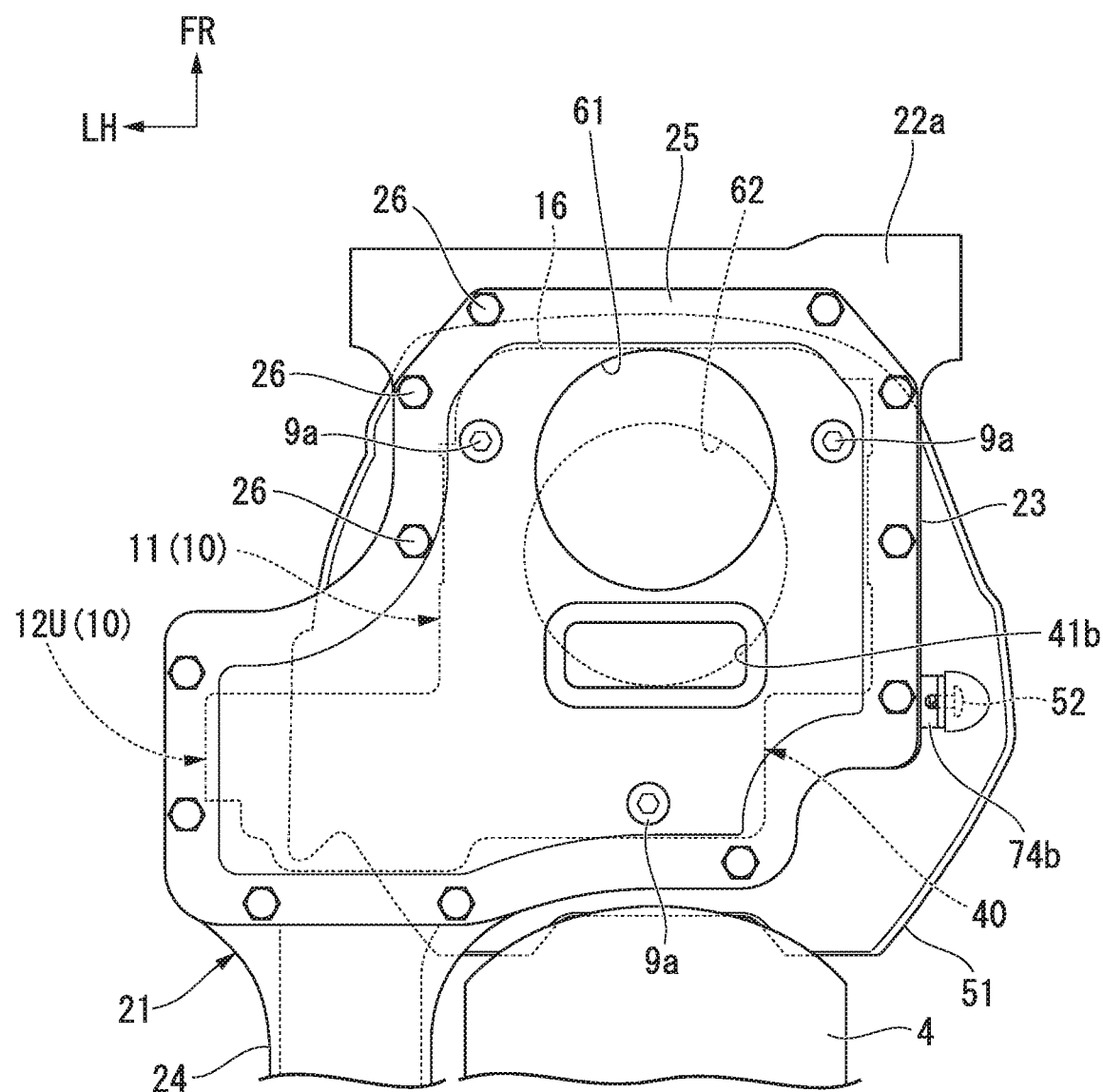
FIG. 4 is a plan view of the electric motor cooling structure according to the embodiment.

As shown in FIG. 4, the lid 25 is attached to an opening forming section 23b (a sidewall section, see FIG. 5) of the accommodating section main body 23 by a plurality of (for example, in the embodiment, 12) bolts 26. A plurality of (for example, in the embodiment, 12) screw holes 23c (see FIG. 5) into which the bolts 26 are screwed are formed in the opening forming section 23b.

The cooling air intake port 61 is provided above the unit accommodating section 60, and the cooling air outlet port 62 is provided below the unit accommodating section 60. Specifically, the cooling air intake port 61 is formed on an upper surface of the lid 25, and the cooling air outlet port 62 is formed on a lower surface of the accommodating section main body 23. That is, the cooling air intake port 61 vertically opens the lid 25, and the cooling air outlet port 62 vertically opens an outer wall of a lower section of the accommodating section main body 23.

When seen in a plan view of FIG. 4, the cooling air intake port 61 and the cooling air outlet port 62 are formed in a circular shape. When seen in the plan view of FIG. 4, an external form of the cooling air intake port 61 is slightly smaller than that of the cooling air outlet port 62. The cooling air outlet port 62 is formed in a circular shape that is coaxial with a fan axis 50C (see FIG. 6), which will be described below, and smaller than an external form of a fan 51.

The cooling air intake port 61 and the cooling air outlet port 62 are disposed to sandwich the electric motor 11 therebetween to be eccentric with each other in an upward/downward direction. When seen in the plan view of FIG. 4, the cooling air intake port 61 is eccentric forward from the cooling air outlet port 62. When seen in the plan view of FIG. 4, a rear section of the cooling air intake port 61 and a front section of the cooling air intake port 62 overlap each other in the upward/downward direction.

<Protrusion>

As shown in FIG. 5, protrusions 64 protruding toward an inside of the unit accommodating section 60 and directed toward the cooling air outlet port 62 are provided on an inner wall of the unit accommodating section 60. The plurality of protrusions 64 are disposed on the inner wall of the accommodating section main body 23. The plurality of protrusions 64 are disposed along an inner circumference of the opening forming section 23b of the accommodating section main body 23 at intervals. The protrusions 64 are inclined to correspond to a longitudinal deviation between the cooling air intake port 61 and the cooling air outlet port 62. That is, the protrusions 64 vertically extend to be slightly inclined to be disposed rearward as they go downward.

<Arm Section>

As shown in FIG. 2, the arm section 24 is formed in a cylindrical shape extending forward and rearward. The arm section 24 extends from the pivot section 22a (specifically, the accommodating section main body 23 behind the pivot section 22a) toward a rear wheel support mechanism 30. When seen in a cross-sectional view of FIG. 5, a portion of an inner portion of the arm section 24 in the vehicle width direction facing the tire of the rear wheel 4 is formed in an arc shape smoothly continuous to a rear wall of the accommodating section main body 23 along an external form of the tire. When seen in the cross-sectional view of FIG. 5, an outer portion of the arm section 24 in the vehicle width direction is symmetrical with respect to a shape of an inner portion in the vehicle width direction, and formed in an arc shape smoothly continuous to a rear wall of the accommodating section main body 23. A cross section of the arm section 24 perpendicular to (crossing) the longitudinal direction is formed in a closed annular shape. Further, reference numeral 27 in the drawings designates a support section under the rear suspension (see FIG. 2) that pivotably supports a lower end portion of the rear suspension 6, and reference numeral 28C in the drawings designates a shaft axis (see FIG. 5) that is a central axis of the drive shaft 28.

<Electric Motor>

The electric motor 11 is disposed in front of the rear wheel. The electric motor 11 is an inner rotor type motor. As shown in FIG. 5, the electric motor 11 includes an inner rotor 13, and a stator 14 supported by the housing 40. A rotation axis of the electric motor 11 (hereinafter, referred to as "a motor axis 11C") extends in a vehicle forward/rearward direction. The motor axis 11C is disposed at a center in the vehicle width direction. When seen in a direction along the motor axis 11C (when seen in a cross-sectional view of FIG. 8), an external form of the electric motor 11 is formed in a circular shape.

The inner rotor 13 includes an inner rotor main body 13a having a tubular shape, and a magnet 13b provided on an outer circumferential surface of the inner rotor main body 13a. The inner circumferential surface of the inner rotor main body 13a is spline-coupled to a motor output shaft 15 that forms the motor axis 11C.

The stator 14 includes a stator yoke 14a formed in an annular shape, a plurality of teeth 14b coupled to the stator yoke 14a and radially provided with respect to the motor axis 11C, and a coil 14c formed of a conductive wire wound on the teeth 14b. The stator yoke 14a is fixed to the housing 40 by a plurality of (in FIG. 5, only one is shown) bolts 16a. The electric motor 11 is supported by the housing 40 in a state in which the outer circumferential surface of the stator yoke 14a is exposed in the unit accommodating section 60. Further, reference numeral 16 in the drawings designates a cap-shaped motor cover configured to cover a front side of the electric motor 11.

A bearing 16b configured to rotatably support one end portion (a front end portion) of the motor output shaft 15 is provided on a central section of the motor cover 16 in the radial direction. A bearing 16c configured to rotatably support the other end portion (a rear end portion) of the motor output shaft 15 is provided on a rear wall of the housing 40.

When seen in a side view of FIG. 2, a straight line passing through a pivot axis 22C (the pivot section 22a shown in FIG. 3) and a central axis 4C of the rear wheel axle 4a (the rear wheel axle 4a) is referred to as "a swing arm centerline 21C." When seen in the side view of FIG. 2, the motor axis 11C overlaps the swing arm centerline 21C.

<Speed Reducer>

As shown in FIG. 5, the speed reducer 12 is disposed behind the inner rotor 13 and in front of the rear wheel 4. The speed reducer 12 includes a pinion 15a provided integrally with a rear end portion of the motor output shaft 15, a first speed reduction gear 17 meshed with the pinion 15a, a second speed reduction gear 18 meshed with the first speed reduction gear 17, and a shaft support section 19 configured to rotate with the second speed reduction gear 18. The pinion 15a, the first speed reduction gear 17 and the second speed reduction gear 18 are disposed in sequence from an inside in the vehicle width direction toward the outside (a left side) in the vehicle width direction.

The first speed reduction gear 17 includes a gear shaft 17a having an axis 17C parallel to the motor output shaft 15 and the drive shaft 28. A front rear end portion of the gear shaft 17a is rotatably supported by bearings 17b and 17d provided in the housing 40, respectively.

The shaft support section 19 is disposed coaxially with the drive shaft 28. A rear section of the shaft support section 19 is formed in a cylindrical shape. An inner circumferential surface of the rear section of the shaft support section 19 is spline-coupled to a front end portion of the drive shaft 28. A front end portion and a rear section of the shaft support section 19 are rotatably supported by bearings 19b and 19d provided in the housing 40, respectively.

<Rear Wheel Support Mechanism>

As shown in FIG. 2, the rear wheel support mechanism 30 is disposed on a left side of the rear wheel 4. The rear wheel support mechanism 30 includes a third speed reduction gear 31 having a front end portion to which a rear end portion of the drive shaft 28 is coupled, a final gear 32 meshed with the third speed reduction gear 31, and a final gear case 33 configured to accommodate the third speed reduction gear 31 and the final gear 32.

The third speed reduction gear 31 includes a gear shaft 31a that is coaxial with the drive shaft 28. An inner circumferential surface of a rear end portion of the drive shaft 28 formed in a cylindrical shape is spline-coupled to a front end portion of the gear shaft 31a. A bevel gear 31b meshed with the final gear 32 is provided on a rear section of the gear shaft 31a. A longitudinal central section of the gear shaft 31a is rotatably supported by a bearing (not shown) provided in the final gear case 33.

The final gear 32 includes a gear shaft 32a having a cylindrical shape that is coaxial with the rear wheel axle 4a, and a bevel gear 32b meshed with the third speed reduction gear 31. An inner circumferential surface of the gear shaft 32a is spline-coupled to an outer circumferential surface of the rear wheel axle 4a. An inner portion in the vehicle width direction and an outer portion in the vehicle width direction of the gear shaft 32a are rotatably supported by bearings (not shown) provided in the final gear case 33.

According to the above-mentioned configuration, rotation of the motor output shaft 15 (see FIG. 5) is reduced at a predetermined speed reduction ratio and transmitted to the rear wheel axle 4a.

Further, reference numeral 38 in the drawings designates a bolt configured to fasten and fix a rear end portion of the arm section 24 to a front end portion of the final gear case 33.

<Housing>

As shown in FIG. 3, the housing 40 includes a first housing half body 41 configured to accommodate a front section of the speed reducer 12, and a second housing half body 42 configured to accommodate a rear section of the speed reducer 12 and coupled to the first housing half body 41.

A stator support section 41a protruding forward from an inside of the first housing half body 41 in the vehicle width direction and configured to support the stator 14 is provided on the first housing half body 41. A terminal connecting section 41b that opens vertically is formed on an upper section of the first housing half body 41. For example, a terminal (not shown) or the like of a wiring configured to supply electric power to the electric motor 11 is connected to the terminal connecting section 41b.

The second housing half body 42 is fixed to the first housing half body 41 by a plurality of (in FIG. 3, only four are shown) bolts 43.

<Driving Unit>

The driving unit 10 is disposed in front of the arm section 24 of the swing arm 21. The driving unit 10 is accommodated in and attached to the swing arm 21. The driving unit 10 is detachably attached to the swing arm 21. The driving unit 10 is attached to the swing arm 21 by inserting a plurality of (in FIG. 5, only four are shown) bolts 44 into the housing 40 to be fastened to the accommodating section main body 23.

Further, the lid 25 (see FIG. 4) fastened to the opening forming section 23b of the accommodating section main body 23 by the bolts is removed to open the opening 23a of the accommodating section main body 23, the bolts 44 fastened to the accommodating section main body 23 are removed, coupling of the drive shaft 28 is released, and thus, the driving unit 10 can be removed from the swing arm 21. Further, reference numeral 63 in the drawings designates a gap (a communication section) formed between the inner wall of the accommodating section main body 23 and the driving unit 10.

<Speed Reducer Unit>

The speed reducer unit 12U is detachably attached to the swing arm 21. For example, in a state in which the driving unit 10 is removed from the swing arm 21, the motor cover 16 fastened to the housing 40 by the bolts is removed together with the stator yoke 14a and the electric motor 11 is removed from the housing 40, and thus, the speed reducer unit 12U can be removed from the swing arm 21.

<Rear Fender (Upper Cover Member)>

Figure 8:
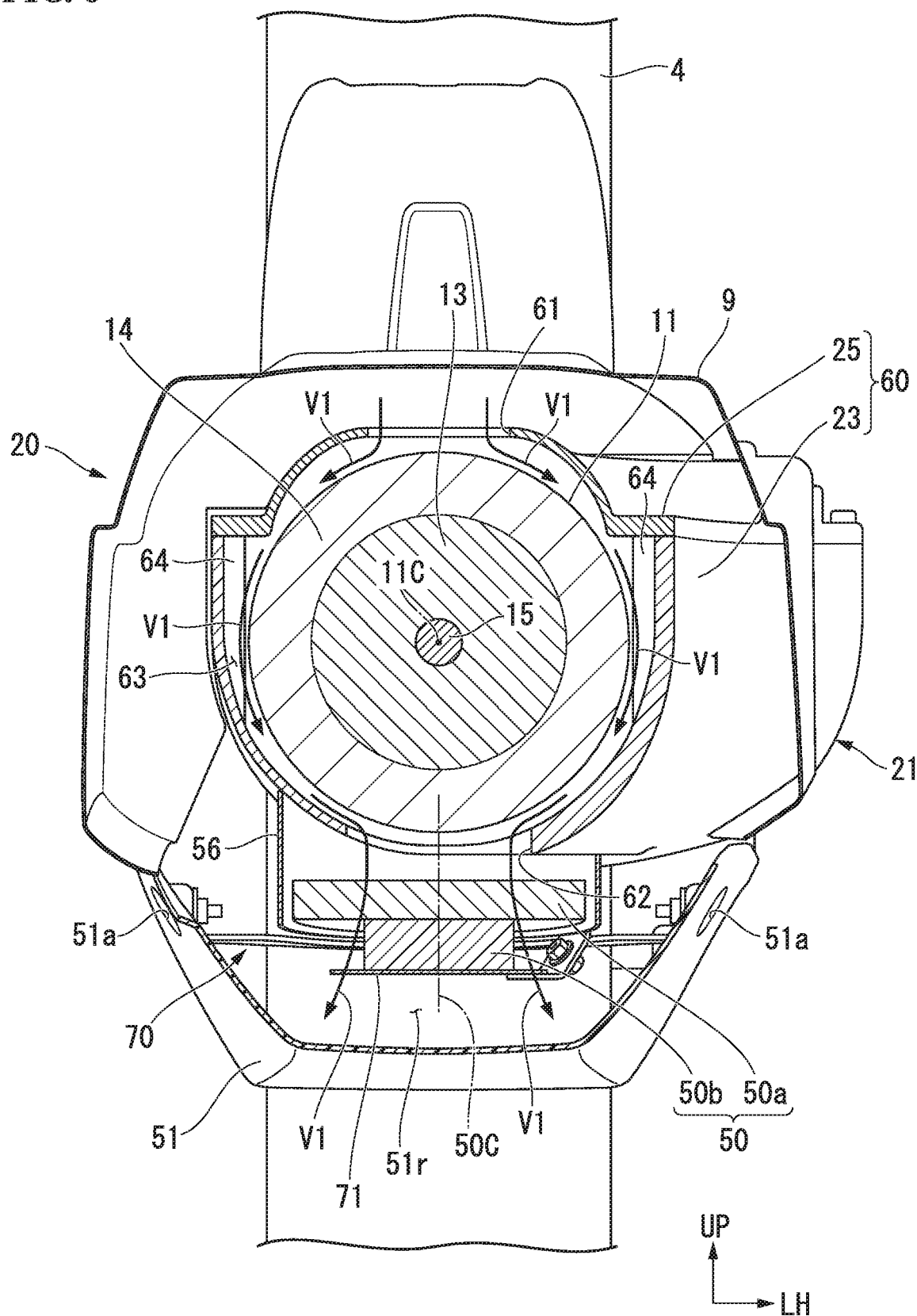
FIG. 8 is a view including a cross section taken along line VIII-VIII in FIG. 2.

As shown in FIG. 4, the rear fender 9 (see FIG. 1) is attached to the upper surface of the lid 25 by a plurality of (for example, in the embodiment, 3) fixing tools 9a (in FIG. 4, only the fixing tools 9a is shown). As shown in FIG. 8, a rear fender 9 covers an upper side of the cooling air intake port 61 while a lower side thereof is open. When seen in a cross-sectional view of FIG. 8, the rear fender 9 is formed in a U shape that opens downward (an inverted U shape). An external communication port 9h (see FIG. 2) that opens toward the outside of the rear fender 9 is formed in a front section and a sidewall section in the vehicle width direction of the rear fender 9. The external communication port 9h is in communication with the cooling air intake port 61.

<Fan>

As shown in FIG. 8, the electric motor cooling structure 20 further includes a fan 50 configured to introduce external air from the cooling air intake port 61 and send cooling air to the electric motor 11. The fan 50 is disposed below the cooling air outlet port 62. The fan 50 includes a cooling air generating section 50a (for example, a propeller) configured to generate cooling air, and a support section 50b (for example, a propeller driving section) configured to support the cooling air generating section 50a.

Figure 7:
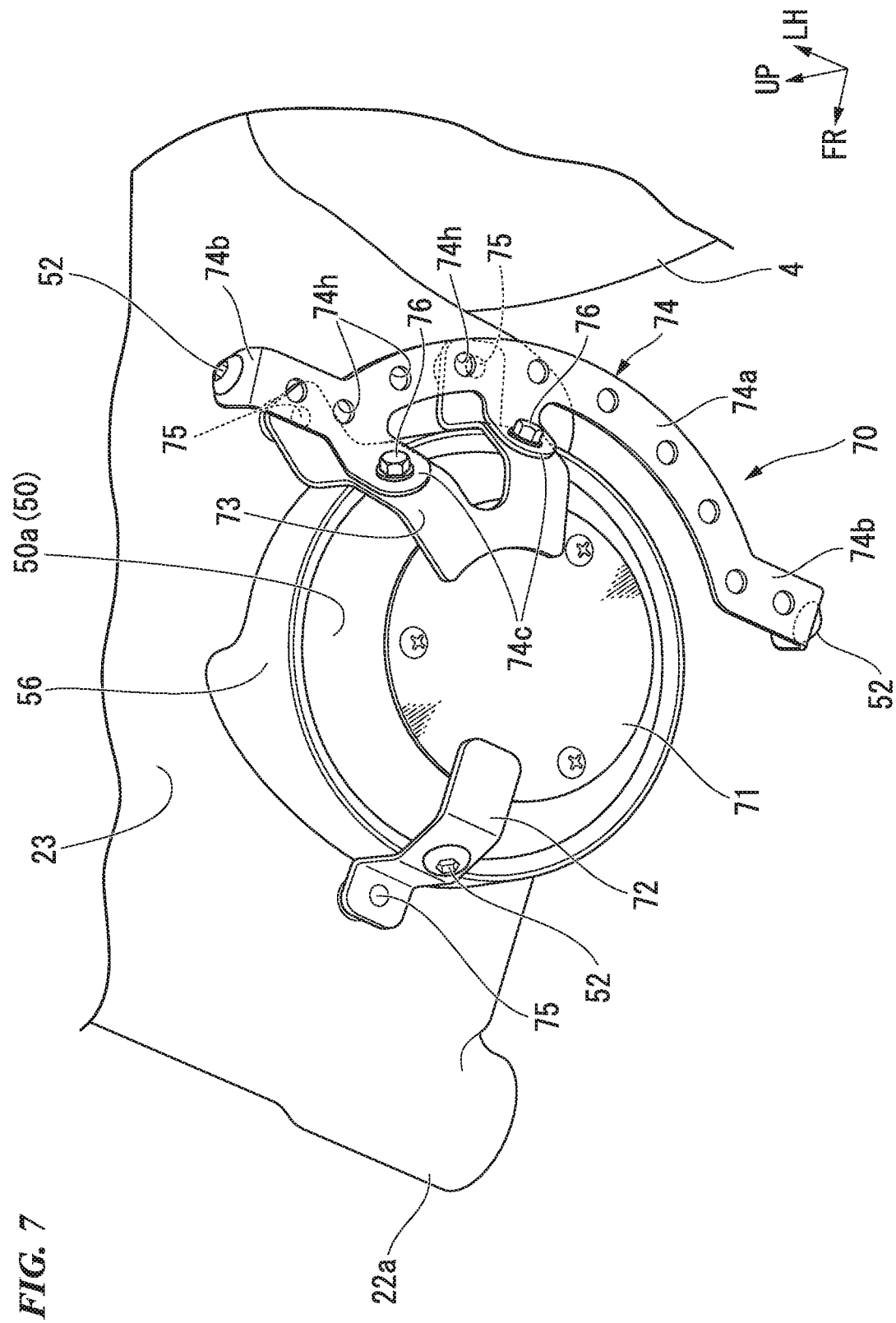
FIG. 7 is a perspective view showing the electric motor cooling structure according to the embodiment from a left lower side.

As shown in FIG. 7, the fan 50 is attached to an outer wall of a lower section of the accommodating section main body 23 by a support member 70. Further, FIG. 7 shows a state of the electric motor cooling structure 20 in which a fan cover 51 is removed.

As shown in FIG. 8, a rotation axis of the fan 50 (hereinafter, referred to as "a fan axis 50C") extends in an upward/downward direction. For example, the fan 50 is an axial flow fan. In the embodiment, air generated by driving of the fan 50 flows along the fan axis 50C and linearly flows downward while turning.

<Shroud (Outer Circumference Cover Member)>

A shroud 56 (an outer circumference cover member) having a cylindrical shape and configured to cover an outer circumference of the fan 50 is provided on the outer circumference of the fan 50. The shroud 56 is coupled to a lower surface of the accommodating section main body 23. As shown in FIG. 8, a lower end of the shroud 56 is disposed below the fan 50. Specifically, when seen in a cross-sectional view of FIG. 8, a lower end of the shroud 56 is disposed below the cooling air generating section 50a and above the support section 50b. Further, the shroud 56 may cover at least a part of the outer circumference of the fan 50.

<Fan Cover (Lower Cover Member)>

The fan cover 51 (a lower cover member) configured to cover the fan 50 from below is provided below the fan 50. When seen in the cross-sectional view of FIG. 8, the fan cover 51 is formed in a U shape that opens upward. The fan cover 51 is attached to the support member 70 by a plurality of (for example, in the embodiment, 3) bolts 52 (see FIG. 7). Further, reference numeral 51a in the drawings designates a bolt insertion hole formed in the fan cover 51.

Figure 6:
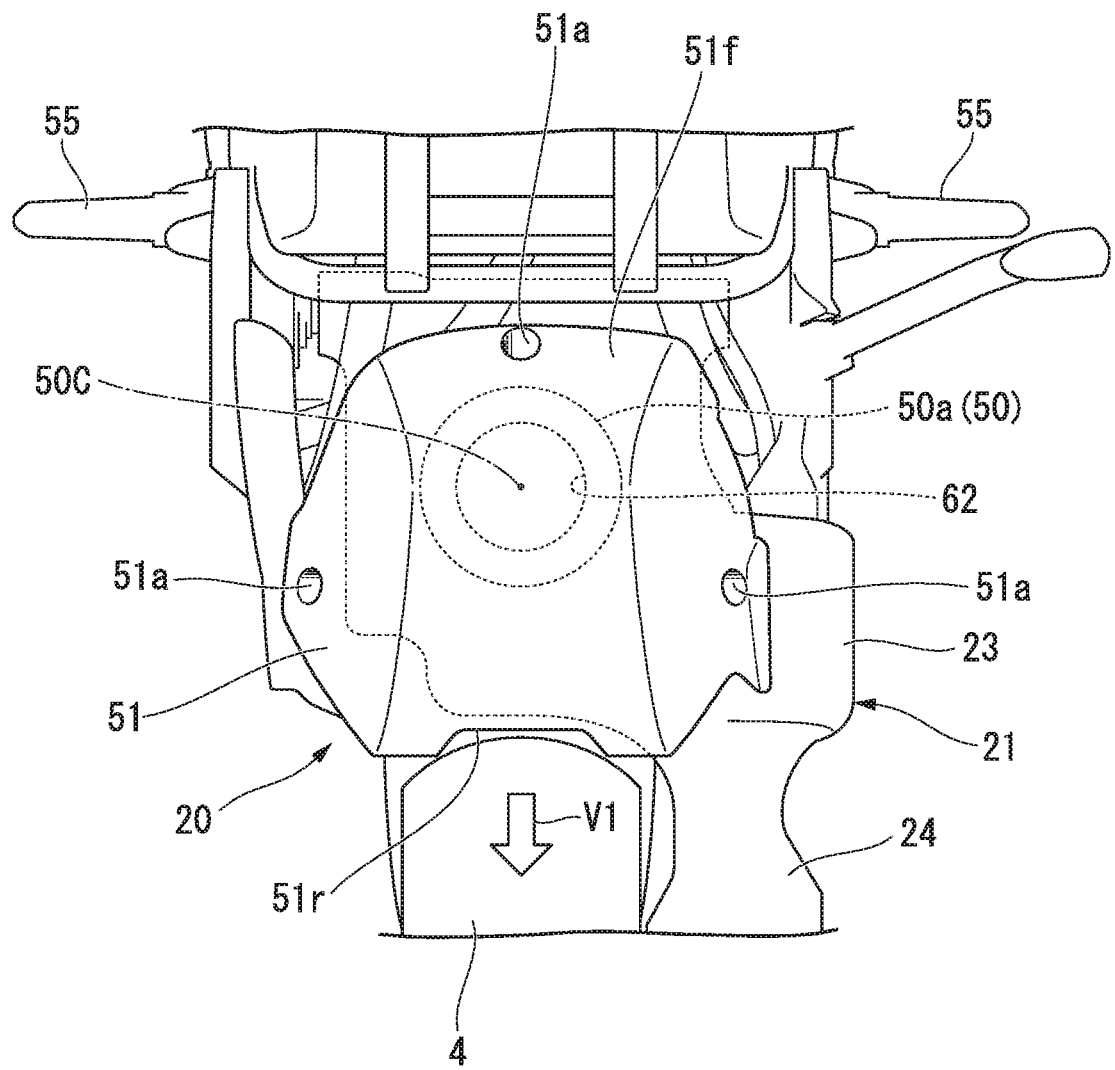
FIG. 6 is a bottom view showing the electric motor cooling structure according to the embodiment.

As shown in FIG. 6, a cooling air blocking section 51f configured to block cooling air sent from the fan 50 is provided in front of the fan cover 51. When seen in the side view of FIG. 2, an external form of the cooling air blocking section 51f is slightly inclined to be disposed upward as it goes forward.

As shown in FIG. 6, a cooling air discharge port 51r configured to discharge cooling air sent from the fan 50 toward a rear side is provided behind the fan cover 51. Specifically, the fan cover 51 covers the fan 50 from front, lower, left and right sides. That is, the fan cover 51 opens the fan 50 rearward only. Here, a cross section when the fan cover 51 is cut along a surface perpendicular to the swing arm centerline 21C (see FIG. 2) is referred to as "a lateral cross section of the fan cover 51"). An external form of a lateral cross section of the fan cover 51 has a diameter that is increased to be disposed outward in the radial direction (outward and downward in the vehicle width direction) as it goes downward. Further, reference numeral 55 in the drawings designates a main step on which an occupant's legs are placed.

<Support Member>

As shown in FIG. 7, the support member 70 includes a support section main body 71 having a disk shape configured to support the fan 50 (specifically, the support section 50b shown in FIG. 8), a front support piece 72 connected to a front section of the support section main body 71 and a lower surface of the accommodating section main body 23 and to which the fan cover 51 (see FIG. 6) is attached, a rear support piece 73 configured to connect the rear section of the support section main body 71 and the lower surface of the accommodating section main body 23, and a connecting member 74 connected to the rear support piece 73 and to which the fan cover 51 is attached.

When seen in a direction along the fan axis 50C (see FIG. 8), an external form of the support section main body 71 is formed in a circular shape that is smaller than that of the fan 50.

The front support piece 72 has a crank shape extending to be inclined forward and upward after extending forward from a front section of the support section main body 71, and then, bent along a front wall of the shroud 56 and a lower surface of the accommodating section main body 23.

The rear support piece 73 is formed in a V shape extending to be branched off rearward and leftward from the rear section of the support section main body 71. The rear support piece 73 has a crank shape extending to be inclined rearward and upward after extending rearward and leftward from the rear section of the support section main body 71, and then, bent along a rear left wall of the shroud 56 and a lower surface of the accommodating section main body 23.

The connecting member 74 extends in the vehicle width direction. When seen in a direction along the fan axis 50C, the connecting member 74 includes a connecting section main body 74a formed in a U shape that opens forward along an external form of the shroud 56, a side support piece 74b bent upward after extending from both ends of the connecting section main body 74a in the vehicle width direction toward the outside in the vehicle width direction, and a connecting piece 74c extending to be inclined forward and downward from a front edge of the connecting section main body 74a and connected to the rear support piece 73. A plurality of (for example, in the embodiment, 10) throughholes 74h having a circular shape when seen in a direction along the fan axis 50C are formed in the connecting section main body 74a and the side support piece 74b.

Further, reference numeral 75 in the drawings designates a coupling section between the lower surface of the accommodating section main body 23 and he support member 70, and reference numeral 76 in the drawings designates a coupling member configured to couple the rear support piece 73 and the connecting member 74.

According to the above-mentioned configuration, when the fan 50 is driven, as shown in FIG. 8, external air flows into the unit accommodating section 60 through the external communication port 9h (see FIG. 2), a space between the rear fender 9 and the lid 25, and an air intake port 61. After that, the external air flowed into the unit accommodating section 60 passes through the communication section 63 (a gap between the inner wall of the unit accommodating section 60 and the driving unit 10, see FIG. 8). Specifically, the communication section 63 distributes the cooling air introduced from the cooling air intake port 61 to both sides of the electric motor 11 (an arrow V1 in FIG. 8). Accordingly, the electric motor 11 is cooled. That is, since retention of hot air in the unit accommodating section 60 can be suppressed and overheating of the electric motor 11 can be suppressed by ventilating air in the communication section 63 using the fan 50, this can contribute to improvement of durability and reduction in size of the electric motor 11.

Further, regardless of driving of the fan 50, the electric motor 11 can be cooled by external air introduced from the external communication port 9h during traveling.

After that, the external air that has cooled the electric motor 11 is exhausted to the outside from behind the fan 50 (a direction of an arrow V1 shown in FIG. 6) through the cooling air discharge port 51r via the cooling air outlet port 62. Accordingly, since the hot air is discharged rearward, during stoppage of the vehicle, discharge of hot air toward an occupant can be avoided while avoiding lifting of dust, sands, dead leaves, and so on, on a road surface.

Further, heat radiation paint may be applied to an outer circumferential surface of the stator 14 (see FIG. 5) in the electric motor 11. Accordingly, heat of the electric motor 11 can be actively transmitted to the communication section 63.

In addition, heat radiation paint may be applied to an inner wall of the unit accommodating section 60. Accordingly, external air flowing through the communication section 63 can be cooled.

In addition, heat radiation paint may be applied to an outer wall of the unit accommodating section 60. Accordingly, heat received by the unit accommodating section 60 can be released to the outside.

As described above, the electric motor cooling structure 20 of the motorcycle 1 of the embodiment includes the swing arm 21 pivotably supported by the vehicle body frame 5 of the saddle riding electric vehicle on the pivot section 22a and extending rearward from the pivot section 22a to rotatably support the rear wheel 4, and the electric motor 11 attached to the swing arm 21 and configured to drive the rear wheel 4, wherein the swing arm 21 includes the unit accommodating section 60 configured to accommodate the electric motor 11, and the cooling air intake port 61 opening toward the outside of the unit accommodating section 60 and disposed on one side of the electric motor 11, the cooling air outlet port 62 opening toward the outside of the unit accommodating section 60 and disposed on the other side of the electric motor 11, and the communication section 63 in communication with the cooling air intake port 61 and the cooling air outlet port 62 and configured to distribute cooling air introduced from the cooling air intake port 61 to both sides of the electric motor 11 are provided in the unit accommodating section 60.

According to the configuration, since the communication section 63 in communication with the cooling air intake port 61 and the cooling air outlet port 62 and configured to distribute the cooling air introduced from the cooling air intake port 61 to both sides of the electric motor 11 is provided in the unit accommodating section 60, the cooling air can abut both side surfaces of the electric motor 11. For this reason, in comparison with the case in which the cooling air abuts only one side surface of the electric motor 11, the entire electric motor 11 is easily cooled. Accordingly, a cooling efficiency of the electric motor 11 can be improved.

In addition, in the embodiment, since the cooling air intake port 61 and the cooling air outlet port 62 are disposed to sandwich the electric motor 11 therebetween to be eccentric in the upward/downward direction, the cooling air introduced from the cooling air intake port 61 can flow throughout the unit accommodating section 60. For this reason, in comparison with the case in which the cooling air intake port 61 and the cooling air outlet port 62 are arranged coaxially in the upward/downward direction, the entire electric motor 11 is easily cooled. Accordingly, a cooling efficiency of the electric motor 11 can be more efficiently improved.

In addition, in the embodiment, since the protrusions 64 protruding toward an inside of the unit accommodating section 60 and directed toward the cooling air outlet port 62 are provided on the inner wall of the unit accommodating section 60, the cooling air introduced from the cooling air intake port 61 can be guided to the cooling air outlet port 62 along the protrusions 64. For this reason, in comparison with the case in which the inner wall of the unit accommodating section 60 is simply flat, the cooling air can be rectified. Accordingly, a cooling efficiency of the electric motor 11 can be further improved.

In addition, in the embodiment, since the cooling air intake port 61 is provided above the unit accommodating section 60 and the cooling air outlet port 62 is provided below the unit accommodating section 60, the cooling air introduced from above the unit accommodating section 60 can be guided downward. That is, even when the cooling air that has cooled the electric motor 11 becomes hot air, the hot air can be guided downward. For this reason, the hot air can be avoided from being guided toward a driver.

In addition, in the embodiment, since the rear fender 9 opening downward and configured to cover the cooling air intake port 61 from above is further provided, intrusion of foreign substances such as rain water or the like into the unit accommodating section 60 can be suppressed.

In addition, in the embodiment, since the fan 50 configured to introduce external air from the cooling air intake port 61 and send cooling air to the electric motor 11 is further provided, the electric motor 11 can be cooled through forced air cooling by the fan 50. For this reason, in comparison with the case in which the electric motor 11 is cooled through natural air cooling only by traveling air, a cooling efficiency of the electric motor 11 can be improved.

In addition, in the embodiment, since the fan 50 is disposed below the cooling air outlet port 62 and further includes the shroud 56 configured to cover at least a part of the outer circumference of the fan 50, in comparison with the case in which the cooling air is exposed to the outer circumference of the fan 50, the cooling air introduced from above the unit accommodating section 60 is easily guided downward by the fan 50. For this reason, even when the cooling air that has cooled the electric motor 11 becomes hot air, the hot air is easily avoided from being guided toward a driver.

In addition, in the embodiment, since the fan cover 51 configured to cover the fan 50 from below is further provided, a downward flow of the cooling air introduced from above the unit accommodating section 60 by the fan 50 can be deflected by the fan cover 51. For this reason, scattering of dust, dead leaves, and so on, on a road surface during stoppage of the vehicle can be more reliably minimized.

In addition, in the embodiment, since the cooling air blocking section 51f configured to block cooling air sent from the fan 50 is provided in front of the fan cover 51 and the cooling air discharge port 51r configured to discharge cooling air sent from the fan 50 rearward is provided behind the fan cover 51, a forward flow of the cooling air introduced from above the unit accommodating section 60 by the fan 50 can be blocked by the cooling air blocking section 51f, and the cooling air introduced from above the unit accommodating section 60 by the fan 50 can be discharged rearward from the cooling air discharge port 51r. For this reason, even when the cooling air that has cooled the electric motor 11 becomes hot air, the hot air can be avoided from being guided toward a driver, and scattering of dust, dead leaves, and so on, on a road surface during stoppage of the vehicle can be suppressed.

In addition, in the embodiment, since the motor axis 11C extends in the vehicle forward/rearward direction and the external form of the electric motor 11 has a circular shape when seen in a direction along the motor axis 11C, the cooling air introduced from the cooling air intake port 61 can be rectified along the curved outer circumferential surface of the electric motor 11. For this reason, in comparison with the case in which the external form of the electric motor 11 is a rectangular parallelepiped shape, the entire electric motor 11 is easily cooled. Accordingly, a cooling efficiency of the electric motor 11 can be improved.

Further, while the motorcycle 1 including the driving unit 10 provided with the electric motor 11 has been exemplarily described as an example of the saddle riding electric vehicle in the embodiment, there is no limitation thereto. For example, the motorcycle 1 may be a saddle riding hybrid vehicle on which an engine is mounted on a vehicle body side.

In addition, while a cantilevered swing arm in which the arm section 24 of the swing arm 21 is disposed only one side (a left side only) of the rear wheel 4 in the vehicle width direction has been exemplarily described in the embodiment, there is no limitation thereto. For example, a double wishbone type swing arm in which an arm section of a swing arm is disposed at both sides of a rear wheel in a vehicle width direction may be provided.

In addition, while the example in which the fan cover 51 configured to cover the fan 50 from below has been exemplarily described in the embodiment, there is no limitation thereto. For example, the electric motor cooling structure 20 may not include the fan cover 51.

<Variant>

Figure 9:
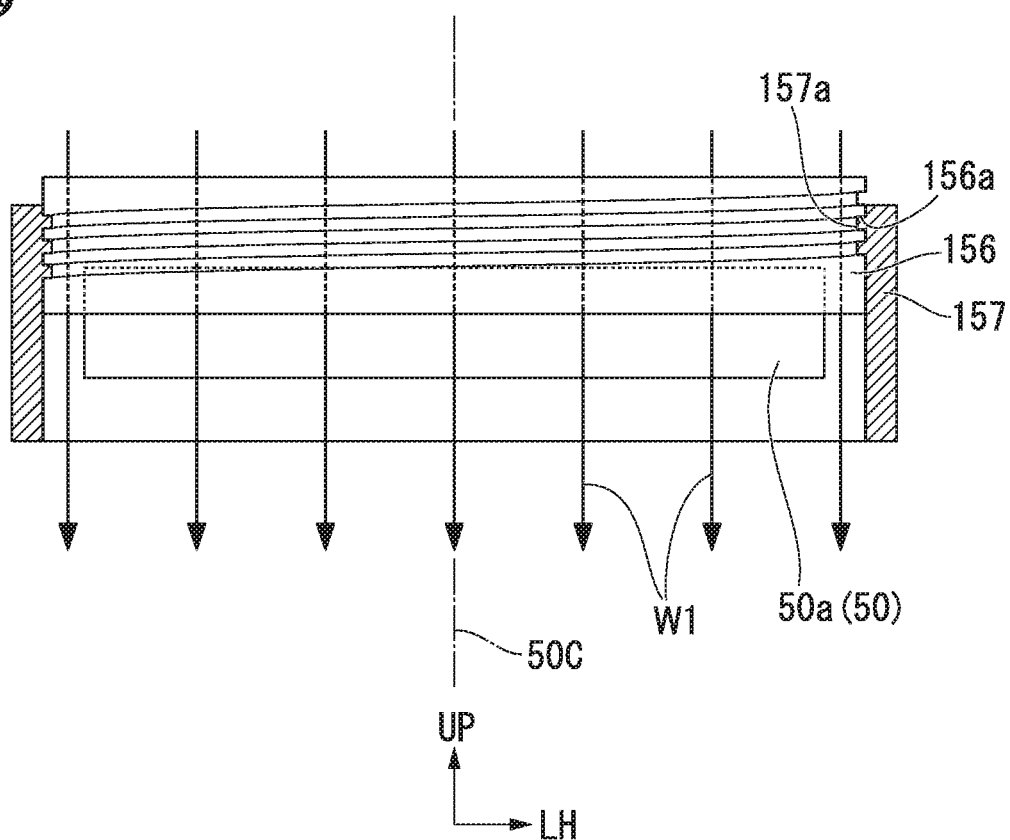
FIG. 9 is a view showing a covering position of an electric motor cooling structure according to a variant.

In addition, as shown in FIG. 9, an electric motor cooling structure may further include an inner shroud 156 and an outer shroud 157 having a cylindrical shape that covers an outer circumference of the fan 50 as an outer circumference cover member. Further, in FIGS. 9 and 10, for convenience' sake, a cooling section generating section 50*a* in the fan 50 is shown, and illustration of the support section 50*b* is omitted. In the variant, a cooling section generating section 50*a* is simply referred to as "the fan 50."

The inner shroud 156 is coupled to a lower surface of the accommodating section main body 23 (see FIG. 7).

A lower end of the inner shroud 156 is disposed above a lower end of the fan 50. That is, the lower section of the fan 50 is exposed from the inner shroud 156.

The outer shroud 157 is screwed onto the inner shroud 156. Reference numeral 156*a* in the drawings designates a spiral groove (a female screw section) formed in an outer circumferential surface of the inner shroud 156, and reference numeral 157*a* in the drawings designates a spiral convex section (a male screw section) formed on an inner circumferential surface of a support section of the outer shroud 157.

The outer shroud 157 is displaceable between a covering position (a position shown in FIG. 9) at which an outer circumference of the fan 50 is covered and an exposing position (a position shown in FIG. 10) at which an outer circumference of the fan 50 is exposed.

As shown in FIG. 9, at the covering position, the lower end of the outer shroud 157 is disposed below the lower end of the fan 50. That is, at the covering position, the lower section outer circumference of the fan 50 is covered with the outer shroud 157.

Figure 10:
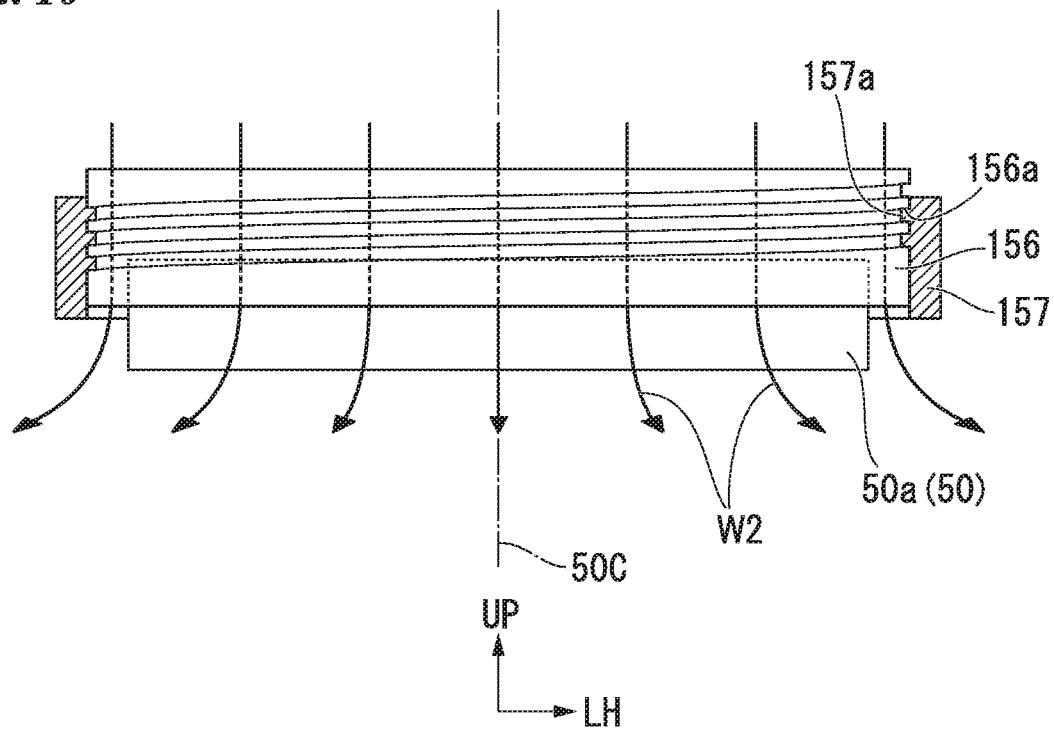
FIG. 10 is a view showing an exposing position of an electric motor cooling structure according to a variant.

Meanwhile, as shown in FIG. 10, at the exposing position, the lower end of the outer shroud 157 is disposed above the lower end of the fan 50. That is, at the exposing position, the lower section of the fan 50 is exposed from the outer shroud 157.

For example, the outer shroud 157 is formed of a bimetal that expands and contracts according to a variation in temperature. For example, the outer shroud 157 contracts when a temperature of the cooling air taken out of the cooling air outlet port 62 (see FIG. 8) is lower than a threshold, and expands when a temperature of the cooling air taken out of the cooling air outlet port 62 is higher than the threshold. That is, when the cooling air that has cooled the electric motor 11 (see FIG. 8) becomes hot air, the outer shroud 157 stops at the exposing position when the temperature of the hot air is lower than the threshold (see FIG. 10), and deforms to the covering position when the temperature of the hot air is higher than the threshold (see FIG. 9).

In the variant, the outer shroud 157 can adjust a direction of the cooling air introduced from above the unit accommodating section 60 using the fan 50 as the outer shroud 157 can be displaced between the covering position at which the outer circumference of the fan 50 is covered and the exposing position at which the outer circumference of the fan 50 is exposed. At the covering position (see FIG. 9), the cooling air introduced from above the unit accommodating section 60 is easily guided downward (an arrow W1 shown in FIG. 9) by the fan 50. For this reason, even when the cooling air that has cooled the electric motor 11 becomes hot air, the hot air is easily avoided from being guided toward a driver. Meanwhile, at the exposing position (see FIG. 10), the cooling air introduced from above the unit accommodating section 60 is easily guided toward the outside of the fan 50 in the radial direction (an arrow W2 shown in FIG. 10) by the fan 50. For this reason, scattering of dust, dead leaves, and so on, on a road surface during stoppage of the vehicle can be suppressed.

In addition, while the example in which the outer shroud 157 is formed of a bimetal has been exemplarily described in the variant, there is no limitation thereto. For example, a driving section (not shown) configured to pivot the outer shroud 157 around the fan axis 50C may be further provided. The driving section may pivot the outer shroud 157 around the fan axis 50C by a predetermined angle. For example, a stepping motor is used as the driving section.

In the configuration, since the outer shroud 157 is pivoted around the fan axis 50C, pivotal movement of the outer shroud 157 around the fan axis 50C can be converted vertical movement along the fan axis 50C by the screwed section between the outer shroud 157 and the inner shroud 156

Further, the present invention is not limited to the embodiment, and for example, all vehicles on which a driver rides on the vehicle body are included as the saddle riding vehicle, and in addition to a motorcycle (including a motorized bicycle and a scooter-type vehicle), a three-wheeled vehicle (including a two-front-wheeled and one-rear-wheeled vehicle in addition to one-front-wheeled and two-rear-wheeled vehicle) or a four-wheeled vehicle may also be included.

Then, the configuration in the embodiment is an example of the present invention, and various modifications such as substitution of known components of the embodiment with known components may be made without departing from the scope of the present invention.

REFERENCE SIGNS LIST 1 motorcycle (saddle riding electric vehicle)
4 rear wheel
5 vehicle body frame
9 rear fender (upper cover member)
10 driving unit
11 electric motor
11C motor axis (rotation axis of electric motor)
20 electric motor cooling structure
21 swing arm
22*a* pivot section
50 fan
51 fan cover (lower cover member)
51*f* cooling air blocking section
51*r* cooling air discharge port 56 shroud (outer circumference cover member)
157 outer shroud (outer circumference cover member)
60 unit accommodating section (electric motor accommodating section)
61 cooling air intake port
62 cooling air outlet port
63 communication section
64 protrusion

What is claim is:

1. An electric motor cooling structure for a saddle riding electric vehicle, comprising:
    a swing arm pivotably supported by a vehicle body frame of a saddle riding electric vehicle at a pivot section and extending rearward from the pivot section to rotatably support a rear wheel;
    an electric motor attached to the swing arm and configured to drive the rear wheel;
    a fan; and
    an outer circumference cover member,
    wherein the swing arm comprises an electric motor accommodating section configured to accommodate the electric motor,
    the electric motor accommodating section includes:
    a cooling air intake port opening toward an outside of the electric motor accommodating section and disposed on one side of the electric motor,
    a cooling air outlet port opening toward an outside of the electric motor accommodating section and disposed on the other side of the electric motor, and
    a communication section in communication with the cooling air intake port and the cooling air outlet port and configured to distribute cooling air introduced from the cooling air intake port to both sides of the electric motor are provided in the electric motor accommodating section,
    the fan is disposed below the cooling air outlet port, and introduces external air from the cooling air intake port to send the cooling air to the electric motor, and
    the outer circumference cover member is configured to cover at least a part of an outer circumference of the fan.

2. The electric motor cooling structure for a saddle riding electric vehicle according to claim 1, wherein the cooling air intake port and the cooling air outlet port are disposed to sandwich the electric motor therebetween to be deviated in an upward/downward direction.

3. The electric motor cooling structure for a saddle riding electric vehicle according to claim 1, wherein a protrusion protruding toward an inside of the electric motor accommodating section and directed toward the cooling air outlet port is provided on an inner wall of the electric motor accommodating section.

4. The electric motor cooling structure for a saddle riding electric vehicle according to claim 1, wherein the cooling air intake port is provided above the electric motor accommodating section and the cooling air outlet port is provided below the electric motor accommodating section.

5. The electric motor cooling structure for a saddle riding electric vehicle according to claim 4, further comprising an upper cover member opening downward and configured to cover the cooling air intake port from above.

6. The electric motor cooling structure for a saddle riding electric vehicle according to claim 1, wherein the outer circumference cover member is displaceable between a covering position at which the outer circumference of the fan is covered and an exposing position at which the outer circumference of the fan is exposed.

7. The electric motor cooling structure for a saddle riding electric vehicle according to claim 1, further comprising a lower cover member configured to cover the fan from below.

8. The electric motor cooling structure for a saddle riding electric vehicle according to claim 7, wherein a cooling air blocking section configured to block the cooling air sent from the fan is provided in front of the lower cover member, and
    a cooling air discharge port configured to discharge the cooling air sent from the fan rearward is provided behind the lower cover member.

9. The electric motor cooling structure for a saddle riding electric vehicle according to claim 1, a rotation axis of the electric motor extends in a vehicle forward/rearward direction, and
    an external form of the electric motor has a circular shape when seen in a direction along the rotation axis.

* * * * *